US012652309B2

(12) United States Patent
Formicola et al.

(10) Patent No.: US 12,652,309 B2
(45) Date of Patent: Jun. 9, 2026

(54) METHOD FOR PROVIDING REAL TIME ZERO TRUST SECURITY IN A SHARED RESOURCE NETWORK

(71) Applicant: Siemens Corporation, Iselin, NJ (US)

(72) Inventors: Valerio Formicola, Princeton, NJ (US); Charif Mahmoudi, Plainsboro, NJ (US); Shashank Shekhar, Lawrenceville, NJ (US)

(73) Assignee: Siemens Corporation, Washington, DC (US)

( * ) Notice: Subject to any disclaimer, the term of this patent is extended or adjusted under 35 U.S.C. 154(b) by 232 days.

(21) Appl. No.: 18/364,828

(22) Filed: Aug. 3, 2023

(65) Prior Publication Data

US 2025/0047702 A1     Feb. 6, 2025

(51) Int. Cl.
*H04L 9/40*          (2022.01)
(52) U.S. Cl.
CPC ................................. *H04L 63/1433* (2013.01)
(58) Field of Classification Search
CPC .................................................. H04L 63/1433
See application file for complete search history.

(56) References Cited

U.S. PATENT DOCUMENTS

| | | | | |
|---|---|---|---|---|
| 9,129,132 | B2 * | 9/2015 | Serrano | G06F 21/6245 |
| 9,602,529 | B2 * | 3/2017 | Jones | H04L 63/1433 |
| 9,910,999 | B1 * | 3/2018 | Yu | G06F 21/6254 |
| 10,142,365 | B2 * | 11/2018 | Grubel | H04L 63/1433 |
| 11,228,610 | B2 * | 1/2022 | Medalion | H04L 63/1433 |
| 11,245,713 | B2 * | 2/2022 | Pendergast | H04L 63/145 |
| 2017/0237778 | A1 * | 8/2017 | DiGiambattista | H04L 63/1433 |
| | | | | 726/1 |
| 2023/0109224 | A1 * | 4/2023 | Shaw | H04W 12/088 |
| | | | | 726/25 |
| 2024/0163261 | A1 * | 5/2024 | Crabtree | H04L 9/3239 |
| 2025/0023887 | A1 * | 1/2025 | Bosch | H04L 63/1416 |
| 2025/0202909 | A1 * | 6/2025 | Kondapi | H04L 63/1416 |
| 2025/0259082 | A1 * | 8/2025 | Crabtree | G06N 3/042 |

(Continued)

FOREIGN PATENT DOCUMENTS

| | | | | |
|---|---|---|---|---|
| EP | | 3907969 A1 * | 11/2021 | ......... G05B 19/4184 |
| WO | WO-2018039792 A1 * | 3/2018 | ............ H04L 12/22 |

(Continued)

*Primary Examiner* — Sarah Su

(57)          ABSTRACT

A method for providing cyber security measures in a shared network estimates in a probabilistic model, a likelihood of a cybersecurity event occurring in a system. Based on the estimated likelihood selectively applies some but not all of the cyber security measures. Based constraints of system resources available for operations a combination discretionary security measures are selected for execution. During runtime of the system, security risk of an aspect of the system is periodically evaluated causing reconfiguration of the security measures for execution based on the estimated security risk and system resources available for operations. Timed automata corresponding to security threats are assigned a risk score associated with the security threat based on one or more states of the automata. An aggregation of multiple risk scores produces a trust score for the overall system. A number of security measures may be selected and allocated based on the trust score.

18 Claims, 5 Drawing Sheets

(56)                    References Cited

U.S. PATENT DOCUMENTS

2025/0390857 A1* 12/2025 Bonstein ................. G06Q 20/22
2026/0012431 A1*  1/2026 Bhat ..................... H04L 47/822

FOREIGN PATENT DOCUMENTS

WO      WO-2023283356 A1 *  1/2023  ......... H04L 63/1416
WO      WO-2023021499 A1 *  2/2023  ......... H04L 63/1433
WO      WO-2024054332 A1 *  3/2024  ........... H04W 12/06
WO      WO-2025024615 A2 *  1/2025  ......... H04L 63/1441

* cited by examiner

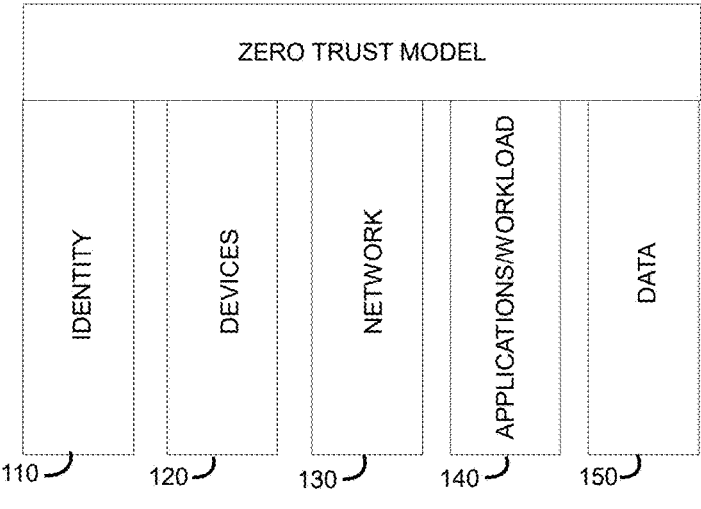

| | | ZERO TRUST MODEL | | |
|---|---|---|---|---|
| IDENTITY | DEVICES | NETWORK | APPLICATIONS/WORKLOAD | DATA |
| 110 | 120 | 130 | 140 | 150 |

EXAMPLE OF MAP FOR ZERO TRUST SECURITY VERIFICATION MEASURES WITH ASSIGNED MEASUREMENT WEIGHTS
(ASSIGNED BY NETWORK OPERATOR TO CONFIGURE REQUIRED SECURITY MEASURES)

| 110 IDENTITY (P1) | | 120 DEVICES (P2) | | 130 NETWORK (P3) | | 140 APPLICATIONS (P4) | | 150 DATA (P5) | |
|---|---|---|---|---|---|---|---|---|---|
| C_1_1: ENTERPRISE MANAGED IDENTIES | 0.1 | R_2_1: DEVICE SIGNALS | 0.05 | C_3_1: DATA IN TRANSIT AND NETWORK PROTOCOLS | 0.1 | C_4_1:VULNERABILITY SCANNING AND MANAGEMENT | 0.1 | C_5_1: LOGGING AND INFORMATION SHARING | 0.1 |
| U_1_1: PIV AND DERIVED PIV | 0.2 | R_2_2: ENDPOINT DETECTION AND RESPONSE (EDR) | 0.058 | C_3_2: MICRO-SEGMENTATION | 0.1 | R_4_1: APPLICATION-SPECIFIC TESTING AND PENTESTING (AUTOMATED) | 0.2 | U_5_1: DATA CATEGORIZATION AND TAGGING | 0.2 |
| C_1_2: MFA | 0.1 | C_2_1: ASSET MANAGEMENT AND INVENTORY | 0.1 | C_3_3: NETWORK LOGGING AND INSPECTION | 0.1 | R_4_2:AUTMATED AND MANUAL EXPERT ANALYSIS | 0.3 | C_5_2: ENCRYPTED DATA AT REST | 0.1 |
| U_1_2: PASSWORD ROTATION LIMIT | 0.1 | | | R_3_1: OPI | 0.05 | U_4_1: IMMUTABLE WORKLOAD ANALYSIS | 0.2 | C_5_3: KEY MANAGEMENT | 0.1 |
| R_1_1: RBAC/ABAC | 0.05 | | | U_3_1: ML/HEURISTICS/META DATA LOGGING ON ENCRYPTED DATA | 0.2 | R_4_3: CI/CD | 0.1 | R_5_1: SECURITY ORCHESTRATION, AUTOMATION, AND RESPONSE (SOAR) | 0.1 |
| | | | | | | U_4_2: IAC | 0.1 | | |
| | | | | | | R_4_4: DEVSECOPS | 0.1 | | |

METHOD FOR PROVIDING REAL TIME ZERO TRUST SECURITY IN A SHARED RESOURCE NETWORK

TECHNICAL FIELD

This application relates to cyber security. More particularly, this application relates to providing cyber security in shared networks.

BACKGROUND

In operational technology (OT) environments, communication of critical industrial data must be provided in real time while maintaining secure communications. Conventionally, cyber security in traditional OT infrastructures relies on physical isolation of the system through a dedicated network infrastructure where the resulting segregation provides some implicit trust between network connections and devices connected to the network.

Recent technologies have exposed OT infrastructures to shared resources or distributed networks such as the Internet. Current communication networks, such as the 5$^{th}$ generation (5G) standards provide data rates and access to resources for operating the OT environment at the risk of exposing the OT system to entities outside of the system owners' control. This provides challenges to provide required security in network operations while provided real time communication and data transfer to meet necessary quality of service (QOS) levels to maintain efficient operations.

Improved methods to provide security while guaranteeing real time communications for OT systems is therefore desirable.

SUMMARY

In networks that require real-time communications, like industrial operations, it is difficult to enforce a sufficient security policy. The resource requirements to implement a full zero trust model like that provided by CISA, cannot be allocated without having a negative impact on guarantees of real-time communications. A method for providing cyber security measures in a shared network requiring real-time communication quality of service according to this disclosure estimates in a probabilistic model, a likelihood of a cybersecurity event occurring in a system. Then based on the estimated likelihood selectively applies some but not all of the cyber security measures in the system.

A configurable table containing the cyber security measures includes indicating a priority level of each of the cyber security measures. The cyber security measures are arranged in the table according to a one of the security pillars corresponding to the five pillars in a CISA zero trust cyber security model. In one embodiment the shared network is a fifth generation (5G) communication network. The system may be an industrial operations environment where real-time communications are critical. For each security measure an identifier is associated with the security measure, the identifier specifying a priority level of critical, relevant, or useful. The method includes allocating system resources for a critical security measure as a necessary security measure, selectively allocating system resources for a relevant security measure on a condition that a security score of the relevant security measure exceeds a first threshold value, and selectively allocating system resources for a useful security measure on a condition that a security score of the useful security measure exceeds a second threshold value.

The total allocation of resources includes a sum of resources for execution of all critical security measures, all relevant security measures exceeding the first threshold and all useful security measures exceeding the second threshold. Based on a constraint of system resources available for operations a combination of relevant security measures and useful security measures are selected for execution. During runtime of the system, a security risk of an aspect of the system is periodically evaluated causing reconfiguration of the security measures for execution based on the estimated security risk and the constraint of system resources available for operations. Timed automata corresponding to a plurality of security threats are assigned a risk score associated with the security threat based on one or more states of the corresponding automata. An aggregation of a plurality of risk scores produces a trust score for the overall system. A number of security measures may be selected and allocated based on the trust score.

A system for implementing security measures in shared network requiring real time network communications includes a computer processor in communication with a non-transitory computer memory. The non-transitory computer memory stores instructions that when executed by the computer processor cause the computer processor to select a portion of a plurality of security measures and execute the selected portion of security measures in the system. The computer processor may further create automata for each of a plurality of security threats and associate a risk score with the security threat based on one or more states of the automata. The computer processor may aggregate a plurality of risk scores to generate a trust score for the system. Using the trust score the computer processor may reallocate an updated portion of the plurality of security measures based on the generated trust score. Periodically, the computer processor may recalculate risk scores for a plurality of security threats to compute an updated trust score and update the selected security measures based on the updated trust score.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 1 an illustration of the CISA zero trust model;

FIG. 2 an example of a table of security functions;

DETAILED DESCRIPTION

Figure 3:
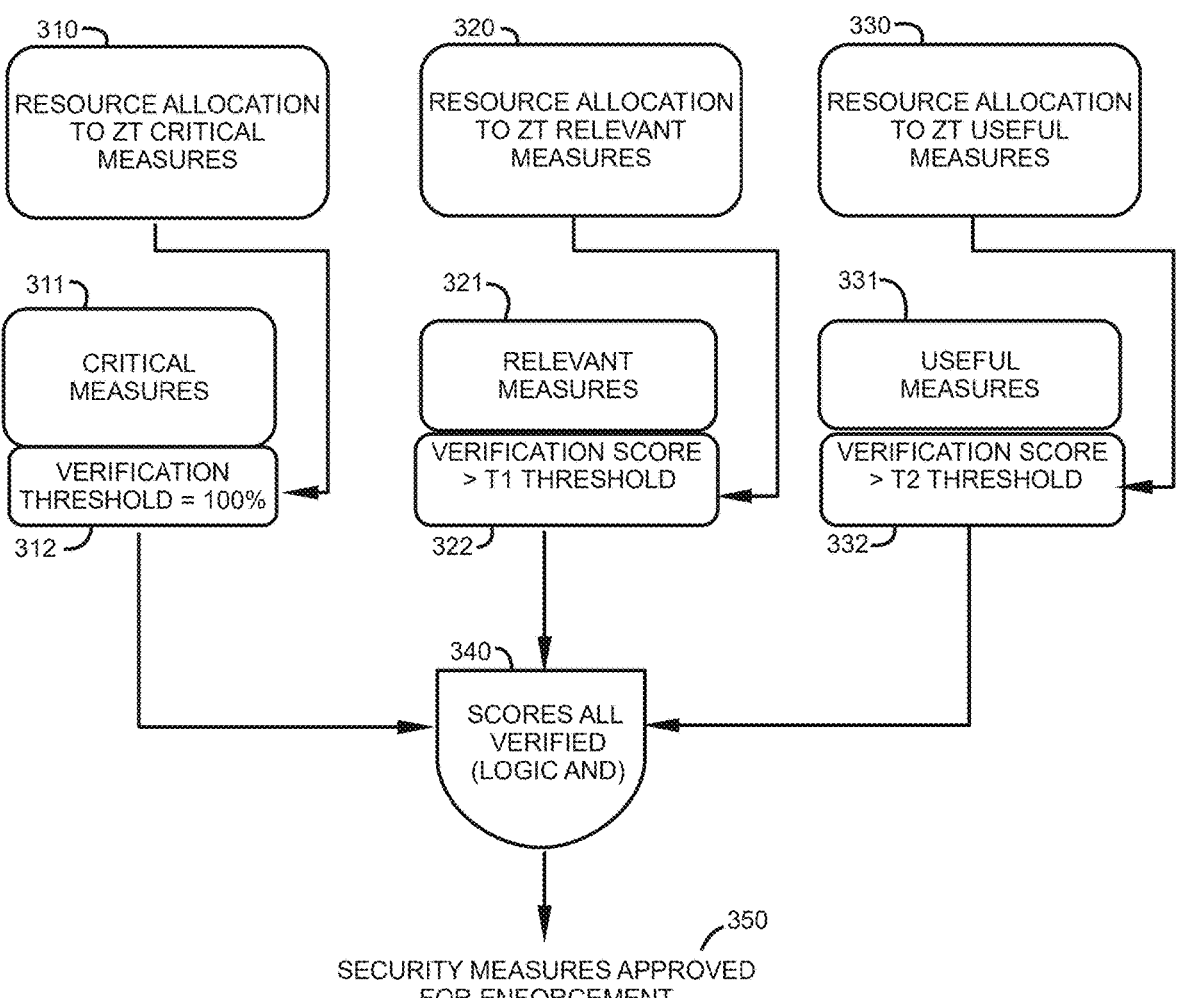
FIG. 3 a flow diagram illustrating the generation of an aggregated overall score.

Embodiments of this disclosure will be described with examples using a 5G network, but it will be understood that other network protocol and shared resources may be used to implement these embodiments. Executing an OT system in a 5G network introduces challenges with respect to resource contention and security threats. As a result, the following problems must be considered.

First, the guarantee for real time OT process execution must be met within the shared network infrastructure. This infrastructure may be based on massive reuse of shared computing and communication resources that may lead to resource contention. Techniques including network slicing may be considered as solutions to this problem.

In addition, increased cyber security must be provided over conventional OT systems that have relied on physical isolation of the OT network using a dedicated network infrastructure. By introducing a shared network like 5G, the network may be exposed to a multitude of cyber threats with a significant reduction of trust in the security aspects of the environment. One approach to providing security in this environment is to implement a zero trust (ZT) security approach. Zero trust architectures assume network and systems operating under a permanent and persistent threat of cyberattacks from malicious actors and/or hackers. Specifically, a ZT model assumes that all entities connected to the network may be controlled by malicious actors. This assumption requires that the network to continuously verify endpoints' trustworthiness before and during accesses to the 5G resources and to guarantee safe release of resources. These security and real time requirements must be enforced simultaneously for an OT system running on a 5G network.

The following described embodiments present a number of solutions that follow the Zero Trust maturity model provided by the Critical Infrastructure Security Agency (CISA). FIG. 1 provides an illustration of the CISA ZT security model 100. The model 100 includes 5 pillars that establish the overall concept of securing an environment where trust between entities in the network cannot be guaranteed. The first pillar address identity 110. Provisions for providing a centralized enterprise-managed set of identities along with personal identification verification (PIV) and derived PIV, multi-factor authentication (MFA), anti-phishing identity verification, natural language processing (NLP) analysis, collection of device signals, and role-based access control (RBAC) and attribute-based access control (ABAC) may all be leveraged to obtain faith in the identity of entities connected to the network.

A second pillar addresses devices 120. This may include maintaining a device inventory and providing management services such as continuous diagnostics and management (CDM) or endpoint detection and response (EDR).

The third pillar involves the network and the environment 130. Actions may include using encrypted DSN and HTTP traffic, providing environmental isolation through application level micro-segmentation for industrial operations, network logging and inspection, deep packet inspection (DPI), machine learning heuristics and metadata logging on encrypted data, network behavioral analysis and user entity and behavior analytics (UEBA), along with intrusion detection and prevention system.

A fourth pillar addresses applications and workloads 140 providing vulnerability scanning and management, connection for application-specific testing and penetration testing, automated and manual expert analysis of application reports and logs, access for third-party security assessment, public vulnerability disclosure control, immutable workload control, and traffic engineering, cloud DevSecOps, continuous integration/continuous delivery (CI/CD), and infrastructure as code (IaC).

Finally, the fifth data pillar 150 provides logging and information sharing control, data and file categorization and tagging, auditable access control, key management tools, security orchestration automation and response (SOAR), and security information and event management (SIEM).

Current solutions exist for implementing the pillars of the CISA zero trust model through applications, software, frameworks or services that may be executed locally or provided as a service through access to service providers. For example, a vulnerability database may be queried on a server, which is hosted in the cloud and maintained by a service provider. However, the pillars of the zero-trust model are not designed to function while providing real time availability as required in OT applications and to integrate with a shared network model like a 5G network.

The embodiments of this disclosure enable a zero trust architecture for hard real-time manufacturing operations by: identifying security requirements of the zero trust model for a manufacturing task, reusing or creating a viable real-time security network slice, creating or activating probabilistic model-checking to monitor real-time 5G slices, creating or activating model checking for security functions available in a 5G infrastructure, associating a participant user equipment (UE) to slices equipped with security functions and operational resources for communications required by the UE, and ensuring that the quality of service (QOS) services are insured with no detrimental effects to real-time properties of the communications.

The challenge of securing real-time systems may be viewed as comprising two levels. First, the ability to automatically define the required security configuration that implements Zero Trust pillars is provided. The security configuration must operate under dynamic conditions relating to security as ongoing operations occur. Further constraints with respect to available network resources for operation for example, bandwidth and computing resources for manufacturing applications, may vary during the processes. The mechanism to allocate the resources for security and real-time operations is achieved via network slicing. Embodiments of this disclosure use security requirements based on a composition of functions pre-defined in a catalogue as specified in a map integrating Zero Trust pillar functions. The allocation of those security functions is used as part of a process for meeting real-time processing requirements of network data and applications. For example, for a controlled unclassified information (CUI) environment, a list of security controls will be provided as defined in the NIST SP 800-53 specification. The security aware algorithm will map the requirement to meta-information associated with existing functions and enable Security Function Chaining to enforce compliance. The chain will be comprised of checks for blocked ports and for protocols such as SSH and monitoring capabilities by way of non-limiting example.

Second, once a network slice is configured, a runtime step that leverages probabilistic modelling for verifying the status of continuous monitoring functions for the zero-trust security is implemented. This step contributes by providing a solution to the resource contention problem in the face of evolving security events during execution of applications in 5G, or due to missing security control operations. Real-time traffic presents challenges related to the ability of the monitoring system to keep up with the amount of processing and communications required for the security pillars.

These two steps leverage the concept of allocating network slicing according to defined priorities and resources for providing services executed as part of a 5G network infrastructure.

In one aspect, embodiments herein provide a model for cataloging a list of security functions needed to implement the CISA zero trust model. The security functions are arranged in a table to produce a map of zero trust security measures.

FIG. 2 provides an example of a table of security functions 200 according to one embodiment of this disclosure. The table 200 may be customized by an operator of the network to establish priorities for executing various security measures. The catalogue provides the ability to segregate different security functions into categories corresponding to the five pillars 110, 120, 130, 140, 150 of the CISA zero trust maturity model.

In another aspect, embodiments of this disclosure specify three categories of criticality for security measures. These categories include Critical (C), Relevant (R), and Useful (U). When identifying a security measure from the catalogue, the security measure may be specified by referencing the category (C,R,U), along with its corresponding pillar and a positional index in the list for that pillar 201. For example, the designation C_5_1 201 identifies the security measure "Logging and Information Sharing" as a critical measure (C), involving the data ZT pillar 150 and is the first measure in the column representing the data pillar 150. An algorithm is provided that determines which security measures should necessarily be allocated to ensure zero trust compliance (e.g., critical measures), as well as which may be allocated opportunistically to improve security awareness of the 5G network (e.g., relevant and useful measures). The allocation algorithm utilizes a criticality score 203 that may be assigned to each security measure by the security administrator based on his/her knowledge and expertise. To be compliant with the CISA zero trust maturity model, critical measures should all be necessarily executed, meaning the threshold for compliance is 100%. Relevant and useful measures may be allocated to achieve an aggregated overall score that is higher than a determined threshold referenced as T1 for relevant measures and T2 for useful measures.

FIG. 3 is a flow diagram illustrating the generation of an aggregated overall score according to an embodiment of this disclosure. A resource allocation is determined for critical measures 310, relevant measures 320 and useful measures 330. From the table of FIG. 2, the selected measures for critical measures 311, relevant measures 321 and useful measures 331 are evaluated to generate a verification score for critical measures 312, relevant measures 322 and useful measures 332. Critical measures always possess a verification threshold of 100% and thus always provide a binary "true" to logic gate 340. For relevant measures, the verification score for a measure is compared to a first threshold level T1 322. If the verification score exceeds T1 the relevant measure will provide a "true" to logic gate 340, if the verification score is less than T1 then a "false" is presented to logic gate 340. For useful measures, the verification score for a measure is compared to a first threshold level T2 332. If the verification score exceeds T2 the relevant measure will provide a "true" to logic gate 340, if the verification score is less than T2 then a "false" is presented to logic gate 340. The outputs of verification processes 312, 322, 332 are evaluated by the logic gate 340 configured as a logical and operator. If all outputs are true, then the security measures are approved for enforcement 350 and the necessary resources are allocated to execute the measures.

In another aspect of embodiments of this disclosure, a timed computation tree logic (TCTL) and timed automata (TA) are used to define a model of potential attacks and associate a severity level to each stage of a given threat. This model serves as an important contributor to the allocation of required resources at runtime created by the varying risk levels encountered by network infrastructure and endpoints (e.g., UEs) during normal operations. Evolution of threats may influence a decision for allocating more resources for security operations at runtime, including the activation of additional controls or monitoring agents.

Figure 4:
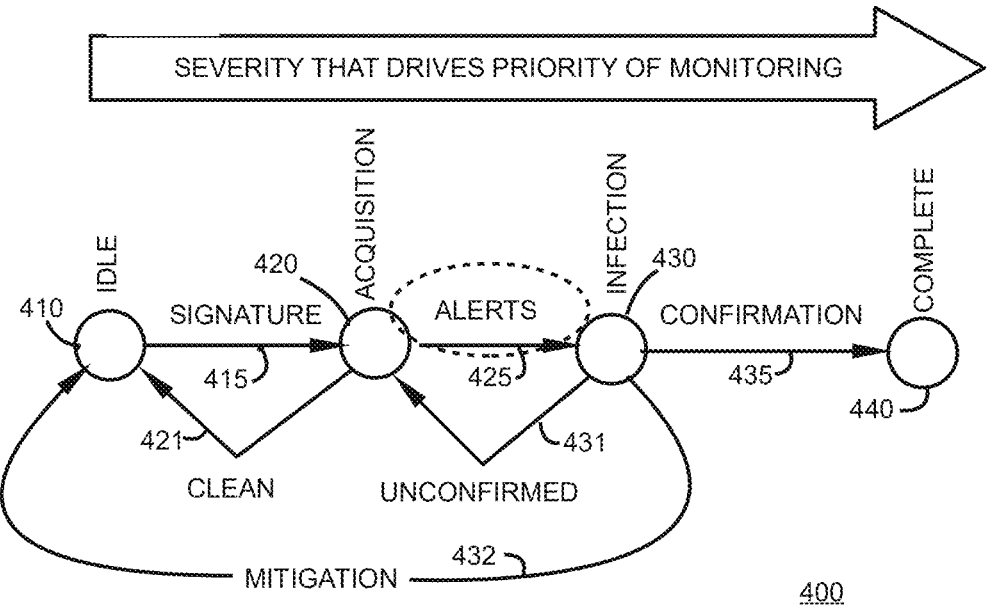
FIG. 4 an example of the use of timedautomata model for a trojan.

By way of example, a threat may be viewed as one or a potentially exploitable vulnerability in the system or the progression of a multi-staged attack (sometimes known as a Kill Chain). FIG. 4 illustrates an example of the use of timed automata model 400 for a trojan. Various states of the system are monitored such as idle 410, acquisition 420, infection 430 and complete 440. From an idle state 410, a signature of a potential attack 415 is recognized. If realized in time, the system may perform a cleaning action 421 and return to an idle state 410. Should the malicious agent be acquired by the system 420, then an alert is generated 425 to determine if an infection has occurred 430. If unconfirmed 431, the state returns to an acquisition state 420 to either clean 421 if possible or generate another alert 425. If an infection state 430 is confirmed, a mitigation process 432 may be attempted to secure the system and return to an idle state 410. If the infection 430 is confirmed 435 and mitigation 432 is not possible, then the system enters the complete state 440 where a maximum level of security is implemented. The TA traces the evolution of infection in the system and checks the probability that the attack will reach a full infection state 430 (i.e., when the infection state is confirmed 435) requiring a maximum level of security. A runtime monitor runs a parameterized model check based on inputs from the security components. For example, if running an Intrusion Detection System (IDS) that detects an intrusion, this observation will be replicated in the parameters provided to the automata. Additional checking will be performed using this updated information. This results in the system's ability to express conditions including the eventuality of a trojan model to evolve to an infection state 430. This information is used to drive the monitoring and dynamic micro-segmentation of communications while maintaining focus on the most imminent security risks.

Figure 5:
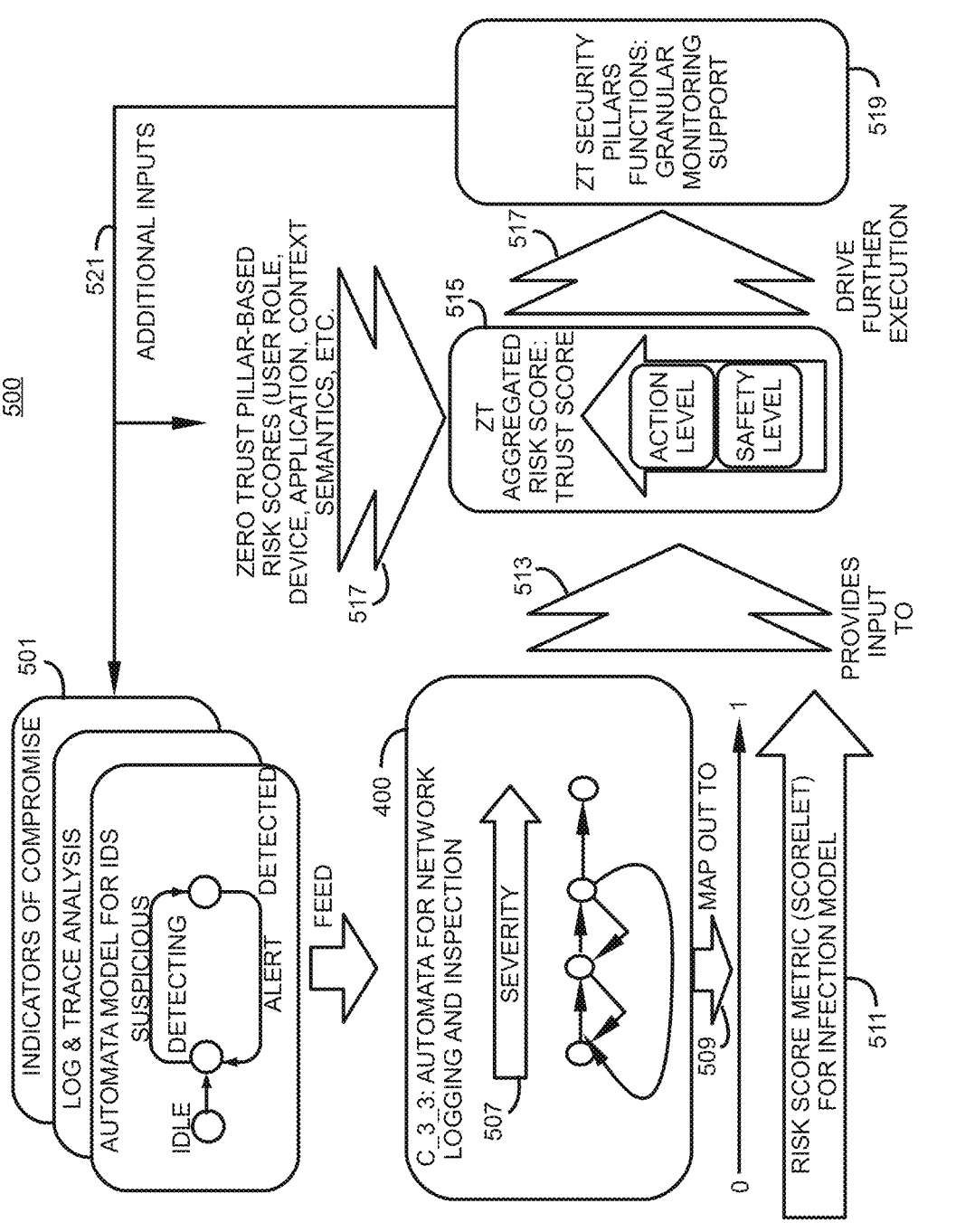
FIG. 5 an illustration of an architecture for computing risk scores determining an action level for security measures.

FIG. 5 is an illustration of an architecture 500 for computing risk scores determining an action level for security measures based on severity according to an embodiment of this disclosure. The embodiments described herein provide an association between an alert security level 507 in specific monitoring models 501 and a risk score (or scorelet) 511.

Models 501 simulate operation of the system using possible network configurations and security measures to compute a probability that a certain state will occur in the system. The likelihood of a given condition may inform the severity of a security concern and provide guidance for prioritizing security actions in the ZT model which should be implemented, and which actions may be omitted. This allows for selectively including and excluding certain security measures based on the likelihood that a condition requiring a given security measure is expected to occur. To provide required quality of service and allocation of resources, the entire zero trust model and its associated measures cannot be implemented in its entirety. The demand for resources would make it impossible to provide real time communications due to competition for resources. Embodiments of this disclosure allow for an informed approach for implementing a portion of the zero-trust model which provides sufficient security protections based on the current state of the system.

A severity level 507 is provided as an input 509 to a risk score calculator 511 associated with an endpoint application.

An aggregation of scorelets 513 from the analysis of multiple observation facts 517 (e.g., zero trust pillar scores based on identity, device, network and environment, data and workload facts) generates a trust score model 515 used to drive 517 execution of granular monitoring on the 5G network functions 519.

The enhanced granular monitoring 519 may be used to refine analysis of the zero trust pillars and to recalculate trust scores in an iterative loop 521 until a final decision is made at the 5G infrastructure level. For example, if a device is determined to be compromised or under a high risk, the 5G infrastructure may produce an alert about the detected violation of security.

The described embodiments provide improved methods and systems for leveraging formal predictions and probabilities that a specific threat model may produce an impact to security of the system. This allows for the selective implementation of zero trust measures. For example, if a probability that a device will be impacted is more likely that an identity related incident, then the measures of pillar 2 may be prioritized over measures associated with pillar 1. This will provide security measures sufficient to address the security concerns of the present state of the system.

Figure 6:
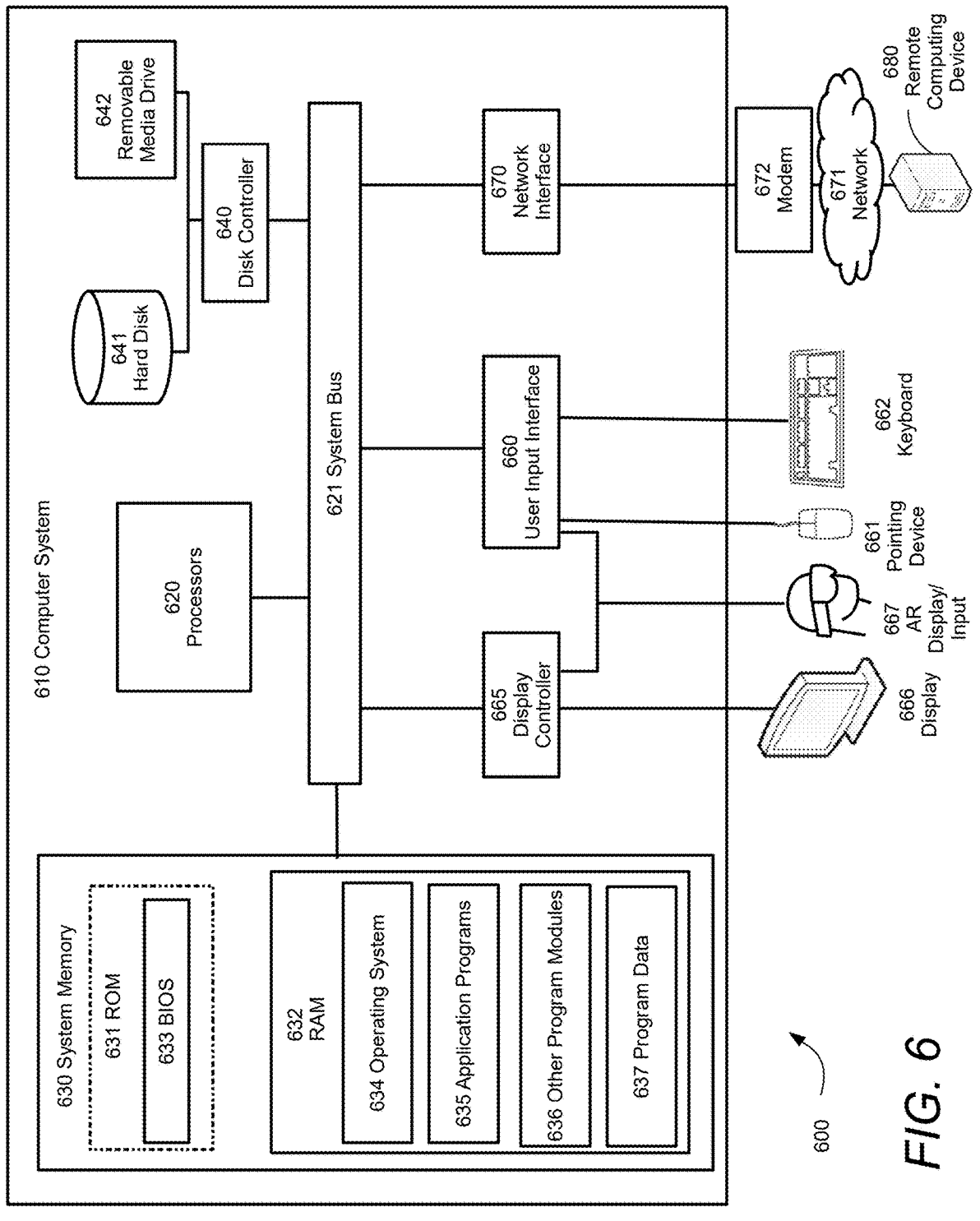
FIG. 6 an exemplary computing environment.

FIG. 6 illustrates an exemplary computing environment 600 within which embodiments of the invention may be implemented. Computers and computing environments, such as computer system 610 and computing environment 600, are known to those of skill in the art and thus are described briefly here.

As shown in FIG. 6, the computer system 610 may include a communication mechanism such as a system bus 621 or other communication mechanism for communicating information within the computer system 610. The computer system 610 further includes one or more processors 620 coupled with the system bus 621 for processing the information.

The processors 620 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 6, the computer system 610 also includes a system memory 630 coupled to the system bus 621 for storing information and instructions to be executed by processors 620. The system memory 630 may include computer readable storage media in the form of volatile and/or nonvolatile memory, such as read only memory (ROM) 631 and/or random-access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the system bus 621 to control one or more storage devices for storing information and instructions, such as a magnetic hard disk 641 and a removable media drive 642 (e.g., floppy disk drive, compact disc drive, tape drive, and/or solid-state drive). Storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the system bus 621 to control a display or monitor 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processors 620. The pointing device 661, for example, may be a mouse, a light pen, a trackball, or a pointing stick for communicating direction information and command selections to the processors 620 and for controlling cursor movement on the display 666. The display 666 may provide a touch screen interface which allows input to supplement or replace the communication of direction information and command selections by the pointing device 661. In some embodiments, an augmented reality device 667 that is wearable by a user, may provide input/output functionality allowing a user to interact with both a physical and virtual world. The augmented reality device 667 is in communication with the display controller 665 and the user input interface 660 allowing a user to interact with virtual items generated in the augmented reality device 667 by the display controller 665. The user may also provide gestures that are detected by the augmented reality device 667 and transmitted to the user input interface 660 as input signals.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a magnetic hard disk 641 or a removable media drive 642. The magnetic hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

The computing environment 600 may further include the computer system 610 operating in a networked environment using logical connections to one or more remote computers, such as remote computing device 680. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

What is claimed is:

1. A method for providing zero trust cyber security measures in a shared network requiring real-time communication quality of service, the method comprising:

estimate in a probabilistic model, a likelihood of a cyber-security event occurring in a system, so as to define an estimated likelihood;

based on the estimated likelihood, selecting a portion of the zero trust cyber security measures, the portion less than all of the zero trust cyber security measures available in the system, so as to define a selected portion of the zero trust cyber security measures;

based on the estimated likelihood, applying only the selected portion of the zero trust cyber security measures in the system;

for each security measure, assigning an identifier to the security measure, the identifier comprising a priority level of critical, relevant, or useful;

allocating system resources for a critical security measure as a necessary security measure;

selectively allocating system resources for a relevant security measure on a condition that a security score of the relevant security measure exceeds a first threshold value; and selectively allocating system resources for a useful security measure on a condition that a security score of the useful security measure exceeds a second threshold value.

2. The method of claim 1, further comprising:

ensuring that real time communication requirements of the system are provided while selecting the cyber security measures to be applied.

3. The method of claim 1, further comprising:

constructing a table containing the cyber security measures, the table being configurable for indicating a priority level of each of the cyber security measures.

4. The method of claim 3, wherein the cyber security measures are arranged in the table according to a security pillar corresponding to one of five pillars in a CISA zero trust cyber security model.

5. The method of claim 1, wherein the shared network is a fifth generation (5G) communication network.

6. The method of claim 1, wherein the system comprises an industrial operations environment.

7. The method of claim 1, wherein a total allocation of resources includes a sum of resources for execution of all critical security measures, all relevant security measures exceeding the first threshold and all useful security measures exceeding the second threshold.

8. The method of claim 7, further including selecting a combination of relevant security measures and useful security measures for execution based on a constraint of system resources available for operations.

9. The method of claim 8, wherein the selection of security measures for execution is based on a pillar of the CISA zero trust model associated with each of the selected security measures.

10. The method of claim 9, further comprising:

during runtime of the system, periodically estimating a security risk of an aspect of the system; and reconfiguring the security measures for execution based on the estimated security risk and the constraint of system resources available for operations.

11. The method of claim 1, further comprising:

defining a timed automata corresponding to a security threat; and assigning a risk score to the security threat based on one or more states of the automata.

12. The method of claim 11, further comprising:

aggregating a plurality of risk scores to produce a trust score for the system.

13. The method of claim 12, further comprising:

reselecting a number of security measures based on the trust score.

14. A system for implementing security measures in a shared network requiring real time network communications, comprising:

a computer processor in communication with a non-transitory computer memory, the non-transitory computer memory storing instructions that when executed by the computer processor cause the computer processor to:

estimate in a probabilistic model, a likelihood of a cybersecurity event occurring in the system, so as to define an estimated likelihood;

based on the estimated likelihood, select a portion of a plurality of zero trust cyber security measures, the portion less than all of the plurality of zero trust cyber security measures available in the system, so as to define a selected portion of the zero trust cyber security measures;

based on the estimated likelihood, execute only the selected portion of the zero trust cyber security measures in the system;

for each security measure, assign an identifier to the security measure, the identifier comprising a priority level of critical, relevant, or useful;

allocate system resources for a critical security measure as a necessary security measure;

selectively allocate system resources for a relevant security measure on a condition that a security score of the relevant security measure exceeds a first threshold value; and selectively allocate system resources for a useful security measure on a condition that a security score of the useful security measure exceeds a second threshold value.

15. The system of claim 14, the non-transitory computer memory further storing instructions that when executed by the computer processor, cause the computer processor to:

create an automata for each of a plurality of security threats;

associate a risk score with the security threat based on one or more states of the automata.

16. The system of claim 15, the non-transitory computer memory further storing instructions that when executed by the computer processor cause the computer processor to:

aggregate a plurality of risk scores to generate a trust score for the system.

17. The system of claim 16, the non-transitory computer memory further storing instructions that when executed by the computer processor cause the computer processor to:

reallocate an updated portion of the plurality of security measures based on the generated trust score.

18. The system of claim 17, the non-transitory computer memory further storing instructions that when executed by the computer processor cause the computer processor to:

periodically recalculate risk scores for a plurality of security threats to compute an updated trust score; and update the selected security measures based on the updated trust score.

* * * * *